United States Patent Office 2,754,839
Patented July 17, 1956

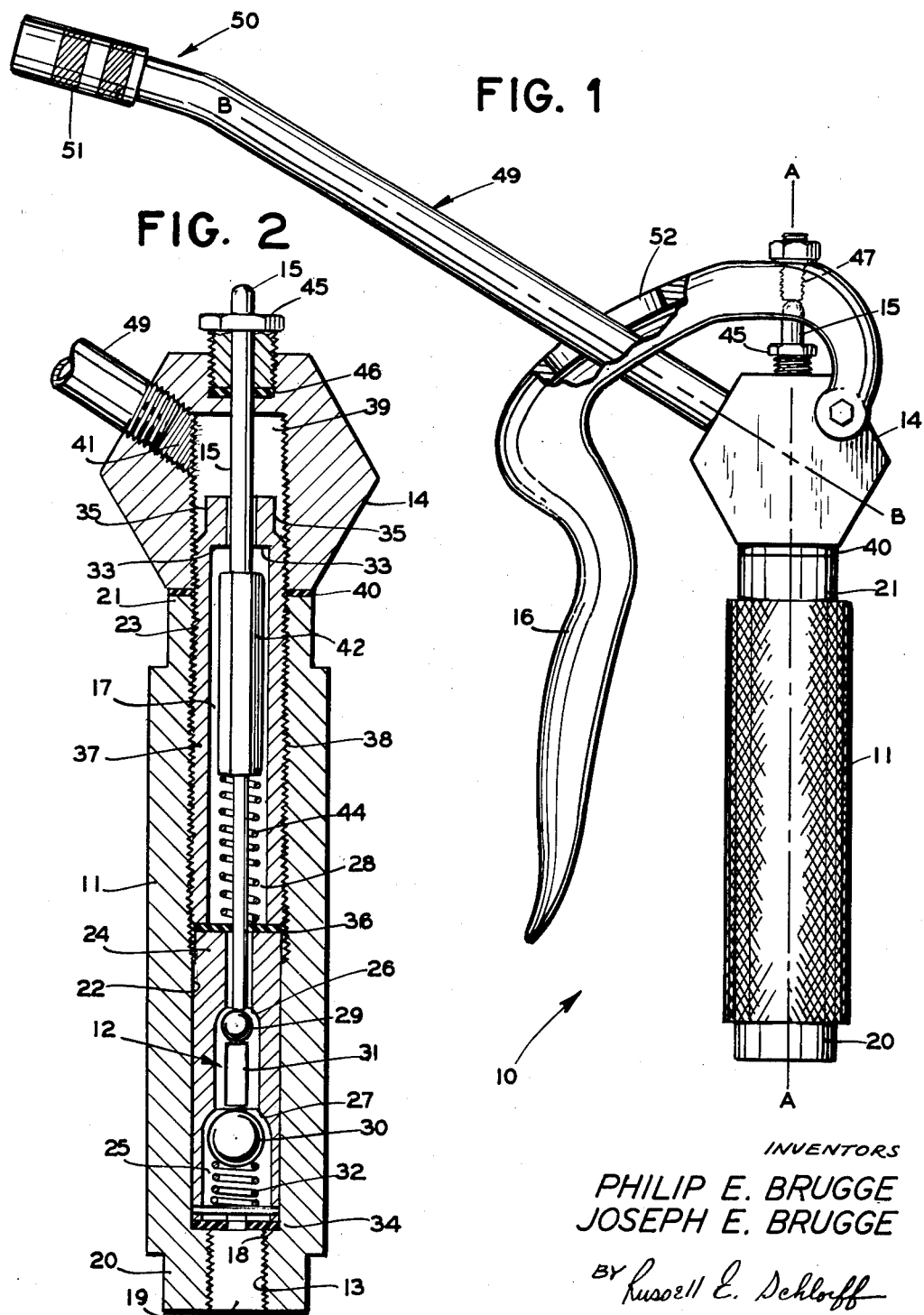

2,754,839

LUBRICATION CONTROL UNIT

Joseph E. Brugge, West Hempstead, and Philip E. Brugge, Hempstead, N. Y.

Application June 25, 1951, Serial No. 233,472

5 Claims. (Cl. 137—454.2)

This invention relates to lubrication apparatus, and more particularly to a lubrication control unit.

Lubrication of the present day automobile is by and large performed at service stations and garages having pressurized lubrication systems. The various lubricants are stored in central tanks and delivered under relatively high pressure through a hose to the place where the automobile is to be greased. The lubrication control handle is the valve used to dispense the lubricant to the various fittings of the automobile, and it should be of such construction that it can withstand this pressure without being subject to leakage, while at the same time it should not require too high a hand pressure to operate.

Moreover, the various fittings are located at sundry places underneath the chassis of the automobile, and many are situated in positions that are difficult to reach. Also, in most installations the person delivering the lubricant is positioned underneath the car and has to constantly reach upward to apply the lubricant; therefore, it is desirable to have a device which is light in weight, which is easy to operate, which is provided with an offset nozzle to reach out-of-the-way fittings, which can withstand constant day-to-day use, which is free from leakage, and which is easy to maintain and service.

The present commercial handles have several defects. Many of them are relatively heavy. Many of them do not have offset nozzles to facilitate access to the various fittings, and many require rather high hand pressure to release the valves. Also, many of the devices have latent defects which lead to early leakage, while others have valve seats which in some cases can not be replaced and which in other cases require factory overhaul. It is the principal object of this invention to provide a device which is free from the various defects enumerated above.

Other objects of the present invention are: to provide a lightweight durable lubrication control handle provided with an offset nozzle which is so constructed that possibility of leakage is kept at a minimum, and which is provided with a replaceable, self-contained valve assembly which can be easily replaced in the field; to provide a lubrication control handle with a vertical valve assembly and an offset nozzle having the above enumerated features; to provide a lubrication control handle which can be easily manufactured on a quantity production basis, which requires a minimum of machining operation, which requires a minimum number of parts, which utilizes mainly parts machined from standard stock, and which facilitates production while rejects are kept at an absolute minimum; and to generally improve upon lubrication control units.

Further objects and objects relating to details and economies of construction, manufacture and use will more definitely appear from the detailed description to follow.

In the form shown of the present invention, there is a vertical valve housing defining a handle. The housing has an inlet port, and a passageway. A self-contained, double ball valve assembly is located in the passageway of the housing. A head portion is secured to the housing. The head has a passageway, aligned with the passageway of the housing, and an outlet port. The outlet port is so positioned that its center line is oblique to the vertical axis of the housing. An offset nozzle is attached to the outlet port. A lever is pivotally secured to the head, and it contacts a valve-operating pin to operate the valve assembly.

Our invention is defined in the appended claims. Where parts are, for clarity and convenience, referred to on the basis of their oriented position shown in the accompanying drawing, no limitation as to positioning of the entire structure is to be implied, since it will be understood that it may be used in any position. Also, in both the description and the claims, parts at times may be identified by specific names for clarity and convenience, but such nomenclature is to be understood as having the broadest meaning consistent with the context and with the concept of our invention as distinguished from the pertinent prior part. The best form in which we have contemplated applying our invention is illustrated in the accompanying drawing forming part of this specification in which:

Fig. 1 is a front elevation of the lubrication control unit.

Fig. 2 is a vertical section taken generally through the axis of the lubrication control unit.

Referring now to the drawing, the lubrication control unit 10 is comprised of a valve housing 11 which defines a handle, a self-contained valve assembly 12, a head portion 14, a valve operating pin 15, and a lever 16.

The housing 11 may be formed from a standard size round bar of metal cut to the desired length; however, hexagonal or other shaped bars may be used. Aluminum has been found to be very satisfactory in that it is light in weight, easy to machine, and more than ample in strength. After the bar is cut to the desired length, it is bored to form a passageway 17. The passageway 17 has a bottom 18. An inlet port 19 is provided at the bottom 20 of the housing 11, and extends through the bottom wall 18 of the passageway 17. The wall surrounding the inlet port 19 is provided with threads 13 to threadedly engage a standard rotating swivel assembly (not shown) which in turn is connected to the hose which delivers the lubricant from the reservoir. It has been found desirable to utilize ⅛" F. P. T. as they are the threads that accommodate approximately 80% of the swivel assemblies in use today; however, reducing or step-up connectors to receive other couplings may be used.

The passageway 17 extends from the inlet port 19 to the top 21 of the housing 11. The wall surrounding the upper portion of passageway 17 is provided with threads 23; the purpose of these threads will be explained subsequently. If desired the outside of the housing 11 may be knurled to provide a roughened surface for a hand grip.

The self-contained valve assembly 12 is located in the passageway 17. The valve assembly 12 makes a sliding fit with the inside wall 22 of the passageway 17. The valve assembly is formed of a cylindrical steel casing 24, which is provided with a passageway 25 for the flow of the lubricants. Two vertically spaced valve seats 26 and 27, which may be approximately hemispherical, are integrally formed in the casing 24 across the passageway 25. The upper of the valve seats 26 may be of a smaller diameter than the lower seat 27 with the size of passageway 25 being correspondingly reduced in size. Spherical valve members 29 and 30 are biased against the valve seats 26 and 27, respectively, by a strong spring 32 which is anchored to the casing 24. A spacer 31 is positioned between the two valve members 29 and 30 so that any force transmitted to the one valve member is correspondingly transmitted to the valve member. A slight tolerance may be provided between the valve members and spacer so that if either valve member is for any reason prohibited from closing the other valve member may completely close, thereby stopping the flow of the lubricant. The use of two valve members in the valve assembly provides a more positive sealing action, thereby preventing leakage. It is also, in effect, self-cleaning, since if a particle of foreign material gets caught under either valve the valve assembly will still close, and the foreign matter can move along through the unit the next time the valve is operated.

A copper packing gasket 34 is positioned between the bottom 18 of the passageway 17 and the valve assembly 12.

A similar gasket 36 is positioned on top of the valve assembly 12. These gaskets are spread to prevent leakage along the inside wall 22 of the housing 11.

A nipple 37, having threads 38 throughout its entire length, is threadedly engaged with the threads 23 on the top of the valve housing 11. The nipple 37 serves a twofold purpose, first, by tightening it sufficiently the gaskets 34 and 36 are spread, thereby preventing leakage along the inside wall 22 of the housing 11, and secondly, it provides a connector to which the head portion 14 can be easily attached. The nipple is provided with a passageway 28 and shoulder 33, the purpose of which will be explained subsequently. The top of the nipple 37 may be provided with two flat portions 35, 35 to which a wrench can be applied to sufficiently tighten the nipple 37.

The valve operating pin 15 extends axially through the passageways 17 and 28. An enlarged portion 42 forms a shoulder, and a strong spring 44 positioned around the valve operating pin 15 biases the pin 15 upwards when there is no pressure on the lever 16. The upward movement of the pin 15 is restricted by the shoulder 33 of the nipple 37. The valve opertaing pin extends downwardly contacting the upper valve member 29.

The head 14 is to be secured to the top of the valve housing 11. The head portion may be formed from a length of standard hexagonal stock cut to the proper length. Aluminum has been used; however, other material or other shaped stock may be used. The head 14 is bored to form a passageway 39 which is aligned with the passageway 17 of the valve housing 11. The lower portion of the wall of the passageway is provided with threads, and the head 14 is secured to the housing 11 by threadedly engaging it with the portion of the nipple 37 that extends past the top 21 of the housing 11. A gasket 40 may be inserted between the housing 11 and 14, although the device has been successfully tested, with no leakage, to relatively high pressures without a gasket.

The head 14 is also provided with an outlet port 41. This port is in communication with the passageway 39. The line of axis $b$ of the outlet port 41 is oblique to the vertical axis $a$ of the housing 11 and head 14. The wall of the outlet port 41 is provided with threads to receive a nozzle 49. The head 14 is further provided with means along its vertical axis $a$ for the passage of the valve operating pin 15. This may be in the form of a threaded sleeve 45. The head and bottom of the sleeve 45 may be bellied and packing 46 inserted therebetween to prevent leakage along the operating pin 15.

The operating lever 16 is pivotally secured to the head 14. The lever 16 may be formed of cast aluminum. The lever is provided with a portion 47 that strikes the top of the valve operating pin 15. This portion may be an adjusting set screw and nut which can be utilized to compensate for any wear. The adjusting screw is preferably steel and has better wearing qualities than if the aluminum of the lever 16 was utilized as a striking portion 47. The remainder of lever 16 extends around the front of the head 14 and lies approximately parallel to the housing 11. An opening 52 is provided in the lever 16 for the passage of the nozzle 49. This permits the operator to grasp the lever 16 and housing 11 comfortably in his hand. By closing his hand he forces the lever 16 towards the housing 11; this in turn causes the portion 47 to contact the top of the valve operating pin 15, forcing it downward to open the valve assembly 12 allowing lubricant to flow through the handle 10.

The nozzle 49 which may be formed from a standard steel pipe is threadedly engaged in the outlet port 41. The nozzle 49 commences in a line oblique to the vertical axis $a$ of the housing 11 and head 14, and terminates in a portion 50 which bends slightly toward the horizontal. This provides the operator with an offset nozzle which facilitates reaching many out-of-the-way fittings. The end of the nozzle 49 is provided with a conventional hydraulic feed adapter 51. The type of adapter is well known in the art.

The valves 29 and 30 are normally biased against their respective valve seats 26 and 27, and to operate the device the coupling 51 is applied to the fitting of the automobile (not shown) to be lubricated and the lever 16 forced inwardly toward the housing 11. The lever 16 is so pivoted that it contacts the top of the valve operating pin 15 and forces it downward, thereby upsetting the valve members 29 and 30 and allowing lubricant to flow through the passageway of the valve assembly 12 and through the passageway of the housing and head to the coupling and into the fitting. Very little pressure is required to upset the spherical ball valve members, and therefore it is not necessary to provide a mechanism for single-shot delivery inasmuch as slight pressure on the lever will upset the valve member and allow as little or as much lubricant to flow as required. Since the housing is vertical and the nozzle is offset, the operator is permitted to reach out-of-the-way fittings with facility. Also, the lubricant does not have to make any sharp turns in flowing from the hose connection to the coupling, thereby eliminating possible obstructions.

If, as some times happens, some particles of dirt are in the lubrication system and one such particle lodges at one or the other valve seats prohibiting the closing of said valve member, leakage is precluded since the other member will completely close and stop the flow. The next time the unit is used the particle will move along with the lubricant, and be ejected from the handle therewith.

In order to service the handle the head 14 can be removed, and then air can be sent through the housing in reverse fashion to clean it. If it becomes necessary to replace the valve assembly 12, this can easily be extracted and a new assembly installed. These are some advantages which are not found in any of the prior art lubrication units. The valve assembly 12 can be easily removed by unscrewing the nipple 37, extracting the spring 44 and gasket 36 and then sliding out the assembly 12. The assembly is completely self-contained, and an entirely new valve assembly can readily be replaced in the handle. This can be done in the field, inasmuch as no special threads are used in any of the connections.

The present invention is not limited to the specific details set forth in the foregoing disclosure, which should be construed as illustrative and not by way of limitation. In view of the numerous modifications which may be effected therein without departing from the spirit and scope of this invention, it is desired that only such limitations be imposed as are indicated in the appended claims.

We claim:

1. A lubrication control unit comprising: an elongated valve housing having an inlet port at the lower end and a passageway extending from the inlet port longitudinally through the housing, a valve assembly positioned in the passageway of the housing, a valve operating pin projecting from the end of the housing opposite the inlet port; a head detachably secured to the upper end of the housing, the head having a passageway aligned and communicating with the passageway of the housing and having an outlet port, the valve operating pin extending through guide means in the head and projecting from the head, the guide means adapted to serve as a seal preventing the lubricant from fortuitously escaping from the unit, and means cooperating with the valve operating pin to hold the valve operating pin captive upon disassembly of the unit.

2. A lubrication control unit comprising: an elongated valve housing having an inlet port at the lower end and a passageway extending from the inlet port longitudinally through the housing, a valve assembly positioned in the passageway of the housing, a valve operating pin in the passageway with its lower end contacting the valve assembly and its upper end projecting from the end of the housing opposite the inlet port; a threaded nipple engaged in the passageway of the housing having its upper portion extending past the top of the housing and having means cooperating with the valve operating pin to retain the valve operating pin in the housing; a head detachably secured to the upper end of the nipple, the head having a passageway aligned and communicating with the passageway of the housing and having an outlet port, the valve operating pin extending through the head; and an operating lever pivotally attached to the unit and adapted to contact the valve operating means projecting from the head.

3. A lubrication control unit comprising: an elongated valve housing having an inlet port at the lower end and a passageway extending from the inlet port longitudinally through the housing, a self-contained valve assembly positioned in the passageway of the housing, a valve operating pin in the passageway its lower end contacting the valve assembly and its upper end projecting from the end of the housing opposite the inlet port; a threaded nipple engaged in the passageway of the housing having its upper portion extending past the top of the housing and having means cooperating with the valve operating pin to retain the valve operating pin in the housing; a head detachably secured to the upper end of the nipple, the head having a passageway aligned and communicating with the passageway of the housing and having an outlet port, the valve operating pin extending through the head; and an operating lever pivotally attached to the unit and adapted to contact the valve operating means projecting from the head.

4. A lubrication control unit comprising: an elongated valve housing having an inlet port at one end and a passageway extending from the inlet port longitudinally through the housing, a self-contained valve assembly positioned in the passageway of the housing, a head detachably secured to the end of housing opposite the inlet port by means permitting straight-line disassembly of the housing and head, the head having a passageway aligned and communicating with the passageway of the housing and having an outlet port, and valve operating means in the passageway of the head and housing and extending through the head.

5. The lubrication control handle as claimed in claim 4, in which the means permitting straight-line disassembly of the housing and head has a portion cooperating with the valve operating means to hold the valve operating means captive upon disassembly of the housing and head.

References Cited in the file of this patent

UNITED STATES PATENTS

| Number | Name | Date |
|---|---|---|
| 294,674 | Richter | Mar. 4, 1884 |
| 1,144,758 | Desmond | June 29, 1915 |
| 1,773,018 | Whitehouse | Aug. 12, 1930 |
| 1,850,063 | Pepper | Mar. 15, 1932 |
| 1,947,409 | Elton | Feb. 13, 1934 |
| 1,953,007 | Farmer | Mar. 27, 1934 |
| 1,969,225 | Lear | Aug. 7, 1934 |
| 2,042,970 | Thomas | June 2, 1936 |
| 2,043,982 | Bruneau | June 16, 1936 |
| 2,200,830 | Beharrell | May 14, 1940 |
| 2,205,759 | Davis | June 25, 1940 |
| 2,281,737 | Wolefer | May 5, 1942 |
| 2,526,406 | Pfauser | Oct. 17, 1950 |
| 2,546,258 | Farrell | Mar. 27, 1951 |